United States Patent Office 3,836,494
Patented Sept. 17, 1974

3,836,494
METAL COATING COMPOSITIONS PREPARED FROM AQUEOUS DISPERSIONS OF IONOMER AND URON RESINS
Ihab M. Hekal, Downers Grove, and Raymond G. Chelton, Chicago, Ill., assignors to Continental Can Company, Inc., New York, N.Y.
No Drawing. Filed July 17, 1972, Ser. No. 272,268
Int. Cl. C08g 51/24
U.S. Cl. 260—29.44 A      8 Claims

ABSTRACT OF THE DISCLOSURE

Metal surfaces are coated with an aqueous dispersion containing a water dispersible ionomer resin and a heat-curable, thermosetting uron resin.

BACKGROUND OF THE INVENTION

1. Field of the Invention

This invention is related to the coating of metal articles, and more particularly to coating metal articles with aqueous dispersions of ionomer resins.

2. The Prior Art

In the manufacture of metal containers, a protective synthetic resin coating is applied to the interior of the container. The synthetic resins which are employed for coating the interior of the metal container are generally heat-curable, resinous materials which are applied in the form of a solution or dispersion in a volatile organic solvent. The wet-coated metal surface is passed through an oven in which hot air is circulated to evaporate the solvent and to cure the coating material to the required hardness. The removal of the organic solvent creates an air pollution problem which many present day communities will not tolerate.

Among the various methods which have been proposed to avoid the use of organic solvents in preparing synthetic resin coatings for metal surfaces is to formulate the coating as an aqueous dispersion.

Aqueous dispersions of polymers having reactive carboxyl groups and heat curable, thermosetting resins have been proposed by the art as metal coatings, e.g. 2,902,390, U.S. 2,954,358, U.S. 3,053,693, U.S. 3,094,435, 3,107,227, U.S. 3,378,477, U.S. 3,403,088 and 3,466,347. These coating materials have not found wide commercial application in the food container industry as many of these coatings are not sufficiently abrasion resistant to withstand the mechanical handling that coated containers undergo during manufacture. For example, in the manufacture of aluminum cans for carbonated beverages, aluminum blanks are subjected to a metal extrusion operation termed "drawing and ironing." The extruded can is then washed with cleaning reagents to remove oil and other foreign material which may adhere to the can body. After the cleaning operation, the cans are dried and are conveyed to a decorating station where the exterior of the can is decorated. The decorated cans are then baked to dry the printed indicia applied to the can exterior. During the baking operation the can is supported by a stainless steel brush inserted in the can interior. After the cans are decorated, a corrosion resistant coating is applied to the can interior. Although it would be economically advantageous to coat the can interior before decorating and thereafter bake the can to simultaneously dry the printing and harden the coating, this procedure is not followed as most coating materials do not have sufficient abrasion resistance to withstand the scratching and other interruptions formed therein by the steel brushes used to support the cans during the baking operation. It is extremely critical that any coating applied to the interior of the container be as free of interruptions as possible to avoid the consequences of corrosion of any exposed metal surfaces by the packaged products.

High can making speeds and reduced manufacturing costs could be realized with a coating material which could be applied to the can interior before decoration and withstand the abrasive effect of the equipment used to support the cans during the decorating operation. While some aqueous dispersed coating materials have come close to meeting the requirements of abrasion resistance required in container manufacture, none has heretofore been wholly satisfactory.

SUMMARY OF THE INVENTION

In accordance with the present invention, there is provided, dispersed in an aqueous medium, a coating composition for application to metal surfaces to provide an adherent, abrasion resistant coating film, which coating composition is comprised of a mixture of an ionomer resin and a heat curable, thermosetting, uron resin.

As will hereinafter be illustrated, the aqueous coating compositions of the present invention when applied to metal surfaces such as aluminum provide a coating film of sufficient abrasion resistance that the coating compositions can be applied to the interior of cans subjected to handling by stainless steel brushes.

PREFERRED EMBODIMENTS

The term "ionomer resin" as used herein includes within its meaning copolymers of $\alpha$-olefins with an ethylenically unsaturated carboxylic acid in which about 1 to about 50 percent by weight of the carboxylic acid groups have been neutralized by metal ions. The $\alpha$-olefins employed in preparing the acid copolymer are $\alpha$-olefins which have the general formula $RCH=CH_2$ wherein R is either a hydrogen or an alkyl group having from 1 to 8 carbon atoms. Typical examples of suitable olefins include ethylene, propylene, butene-1, heptene1, and 3-methylbutene-1.

The ethylenically unsaturated carboxylic acid component of the copolymer is an $\alpha,\beta$-ethylenically unsaturated carboxylic acid having from 3 to 8 carbon atoms. Examples of such acids are acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate, and maleic anhydride. In the practice of the present invention, ionomer resins prepared from acrylic acid and methacrylic acid are preferred.

The concentration of the $\alpha$-olefin in the acidic copolymer is in the range of about 70 to about 90 weight percent and the concentration of acidic monomer is from about 10 weight percent to about 30 weight percent, and preferably, from 15 to 25 weight percent.

The ionomer resin need not necessarily be a two component polymer. Thus, although the olefin content of the ionomer should be about 70 to about 90 weight percent, more than one olefin can be employed to provide the hydrocarbon nature of the copolymer base. Additionally, any third copolymerizable monomer can be employed in combination with the olefin and the ethylenically unsaturated acid comonomer. The scope of copolymers suitable for use in the present invention is illustrated by the following examples: ethylene/acrylic acid copolymers, ethylene/methacrylic acid copolymers, ethylene/itaconic acid copolymers, ethylene/maleic acid copolymers, ethylene/acrylic acid/methyl methacrylate copolymers, ethylene/methacrylic acid/ethyl acrylate copolymers, ethylene/propylene/acrylic acid copolymers, ethylene/vinyl chloride/acrylic acid copolymers, polyethylene/acrylic acid graft copolymers, polyethylene/methacrylic acid graft copolymers, polypropylene/acrylic acid graft copolymers and polypropylene/methacrylic acid graft copolymers.

The metal ions used to obtain partial neutralization of the olefin–carboxylic acid copolymer will generally have a valence of 1 to 3 inclusive and fall in Groups I (A and B) and II (A and B) and the transition elements of the Periodic Table. Illustrative of the ionomer resins which may be employed in the practice of the present invention are the alkali metal salts of ethylene/acrylic acid and ethylene/methacrylic acid copolymers containing the cations $Na^+$, $K^+$, $Li^+$, the alkaline earth salts of ethylene/acrylic acid and ethylene/methacrylic acid copolymers containing the cations $Ca^{++}$, $Ba^{++}$, $Mg^{++}$, $Sr^{++}$ and the zinc salts of these copolymers. Of these, the alkali metal salts are preferred in the practice of the present invention.

The ionomer resins are prepared by reacting the starting olefin/carboxylic acid copolymer with metal salts such as carbonates or bicarbonates, metal bases such as hydroxides or alkoxides, metal alkyls such as sodium ethyl, butyl lithium, metal akyls such as phenyl lithium, hydrides of the alkali and alkaline earth metals, oxides such as sodium peroxide, zinc oxide or in the case of alkali metal salts even with the free metal itself.

The preparation of ionomer resins is more fully disclosed in U.S. Pat. 3,264,272 to Rees, the disclosure of which is incorporated herein by reference.

The partially neutralized olefin/carboxylic acid copolymer salts or ionomer resins used in the practice of the present invention have sufficient molecular weight to have a melt index of 100 or less and preferably the melt index of the ionomer resin ranges from 5 to 50 as determined by the procedures set forth in ASTM D–1238.

In preparing the aqueous coating compositions of the present invention the free acid content of the ionomer resin generally ranges from about 5 to about 20 percent by weight of the resin and preferably about 10 to about 20 percent by weight. Such ionomer resins are commercially available from the E. I. du Pont de Nemours Company, Inc., Electrochemicals Department, Wilmington, Del. under the trademark Elvax D–1249 and Elvax D–1265. Elvax D–1249 is an ethylene/methacrylic acid copolymer partially neutralized with sodium ion having a free acid content of between 8–13 percent by weight and a melt index of less than 10. Elvax 1265 is an ethylene/methacrylic acid copolymer partially neutralized with sodium ion having a free acid content greater than 13 percent by weight and generally about 14 to 18 percent by weight and a melt index of 10 to 30.

The uron resins used in combination with the ionomer resins to prepare the coating compositions of the present invention are known to the art and are prepared by the condensation of urea with formaldehyde to initially form tetramethylol urea. Dehydration of tetramethylol urea, with elimination of one mole of water between two adjacent N,N′-methylol groups, yields a monocyclic N,N′-bis(methylol) ring compound of the formula

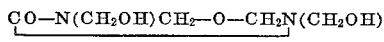

namely, N,N′-bis(methylol) uron. The two methylol groups of N,N′-bis(methylol) uron are then etherified by acidic reaction with an aliphatic alcohol having 1 to 2 carbon atoms as for example, methanol and ethanol, to yield an N,N′-bis(alkoxymethyl) uron of the general formula

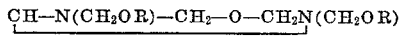

wherein R is an alkyl group having 1 to 2 carbon atoms. The preparation of such uron resins has already been described by Kadowaki [Bull. Chem. Soc. (Japan) 11, 248–61 1936].

The dimethyl ether of N,N′-bis(dimethylol) uron N,N′-bis(methoxymethyl) uron is a uron resin preferred in the practice of the present invention. N,N′-bis(methoxymethyl) uron is available commercially from the Rohm and Haas Company under the trade name Rhonite R–2.

It is an essential and critical feature of the present invention that the uron resin of the type above described be used in combination with the ionomer resin. As will hereinafter be illustrated if an aminoplast resin other than the uron resins of the present invention are used, the applied coating will not have sufficient abrasion resistance to withstand the handling operations involved in metal container manufacturer.

The aqueous dispersions used in the practice of the present invention are prepared by dispersing the ionomer and uron resins in an aqueous liquid system wherein the amount of the uron resin incorporated in the dispersion is dependent upon the acid content of the ionomer resin and is generally that amount which is sufficient to completely react with the free acid of the ionomer resin. For ionomer resins having a free acid content of from 5 to 20 percent by weight, the coating compositions of the present invention are comprised of about 60 to about 90% by weight and preferably about 70 to about 85% by weight of the ionomer resin and about 10 to about 40% by weight and preferably about 15 to about 30% by weight of the uron resin.

The aqueous coating dispersions of the present invention may also contain fillers, dyes, pigments, surfactants, anti-foam agents, plasticizers, stabilizers in accordance with conventional practice in preparing coating compositions.

The coating compositions of this invention can be satisfactorily applied at a solids content ranging from about 1% to about 45% by weight, based on the total weight of the aqueous dispersion. Generally, a solids content of about 2 to about 10% by weight is preferred.

The aqueous coating compositions of the present invention can be satisfactorily applied to metal surfaces by any of the conventional methods employed by the coating industry. However for coating the walls of metal containers, rinse coating is a preferred method. For general coating purposes, roll, spray and flow coating are also useful methods of application.

After applying the coating, the applied coating is cured by heating the coated metal substrate at a temperature of about 350° F. to about 450° F. for a period of about 1 to 10 minutes.

The preferred coating weight for coating the interior walls of metal containers with an adequately protective organic coating suitable for carbonated beverages is in the range of 0.1 to 5 milligrams of ionomer resin coating per square inch of exposed metal surface.

The present invention is illustrated, but not limited, by the following example.

EXAMPLE

Aqueous coating compositions were prepared having a 5% solids content composed of 50 parts of an ionomer resin and varying concentrations i.e., 10 to 25 parts of Rhonite R–2. The aqeuous coating dispersions were dip coated on the inner walls of container bodies fabricated from aluminum blanks of the type conventionally employed in the fabrication of carbonated beverage containers to provide coating films having a film weight of about 1 milligram per square inch. The coated container bodies were baked for 4 minutes at an oven temperature of about 350° F.

The abrasion resistance of the coatings was evaluated by the following test procedure:

A round stainless steel wire brush used to convey aluminum cans from the cleaning station to the drying oven having a diameter slightly larger than the diameter of the cans, was inserted into the can while giving the brush a one-quarter turn twist. The same procedure was repeated while withdrawing the brush. After removal of the brush, the can was filled with a ferric chloride-potassium ferricyanide solution for two minutes and then rinsed and dried. Blue scratches were observed if the wires of the brush penetrated the coating.

The abrasion resistance of container bodies coated with ionomer resin-uron resin aqueous coating composition is recorded in the Table below.

For purposes of contrast, as a control test, container bodies which had been coated in a manner similar to that of the Example but to which an aminoplast resin or a carboxyl containing acrylic resin outside the scope of the invention was substituted for the resin components used in the Example were also subjected to the abrasion test. The results of these control tests (designated by the symbol "C") are also listed in the Table.

thermosetting N,N'bis(alkoxymethyl) uron resin having the general formula

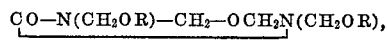

wherein R is an alkyl group having 1 to 2 carbon atoms.

2. The coating composition of claim 1 wherein the α-olefin is ethylene.

3. The composition of claim 1 wherein the ethylenically unsaturated carboxylic acid is selected from the group consisting of acrylic and methacrylic acid.

TABLE

| Test No. | Ionomer resin | Aminoplast resin | Parts | Abrasion test [1] |
|---|---|---|---|---|
| 1 | ELVAX D-1265 [2] | Rhonite R-2 | 10 | Few scratches. |
| 2 | do | do | 15 | None. |
| 3 | do | do | 20 | Do. |
| 4 | do | do | 25 | Do. |
| 5 | ELVAX D-1249 [3] | do | 10 | Moderate scratching. |
| C₁ | ELVAX D-1265 | | 0 | Highly scratched. |
| C₂ | do | Hexamethyoxymethyl-melamine [3] | 20 | Do. |
| C₃ | Acrysol WS-24 [4] | Rhonite R-2 | | Do. |

[1] Average of 6–100 tests.
[2] Contains anionic surfactant.
[3] Cymel 303, product of American Cyanamid.
[4] Acrylic copolymer resin product of Rohm and Haas Co. having carboxyl functional groups cross-linkable with urea and melamine formaldehyde resins.

By reference to the Table, it is immediately apparent that aluminum container bodies coated with ionomer resin dispersions having uron resins incorporated therein in accordance with the present invention exhibit superior abrasion resistance when compared to container bodies coated with an ionomer dispersion in which uron resins are absent, or a carboxyl containing acrylic resin other than an ionomer resin is employed in the coating dispersion.

What is claimed is:

1. A coating composition suitable for coating metal surfaces comprising an aqueous dispersion having dispersed therein 1 to about 45 percent by weight of a mixture comprised of (1) about 60 to about 90 percent by weight of an ionomer resin comprised of a copolymer of about 70 to about 90 weight percent of an α-olefin having the general formula RCH=CH₂ wherein R is selected from the group consisting of hydrogen and an alkyl group having 1 to 8 carbon atoms and about 10 to about 30 weight percent of an α,β-ethylenically unsaturated carboxylic acid having 3 to 8 carbon atoms in which about 1 to about 50 percent by weight of the carboxylic acid groups have been neutralized by metal ions having a valence of 1 to 3 inclusive, selected from the group of metals consisting of Groups I (A and B) and II (A and B) and the transition elements of the Periodic Table and (2) about 10 to 40 percent by weight of a heat curable, 4. The coating composition of claim 1 wherein the N,N'-bis(alkoxymethyl) uron is N,N'-bis(methoxymethyl) uron.

5. The coating composition of claim 1 wherein 1 to 50 percent of the carboxyl groups of the olefin copolymer are neutralized with cations selected from the group consisting of alkali metal, alkaline earth and zinc ions.

6. The coating composition of claim 1 wherein the inorganic salt is the partially neutralized sodium salt of the carboxyl acid containing copolymer.

7. A metal article coated with the coating composition of claim 1.

8. An aluminum container having applied to the internal surface thereof the coating composition of claim 1.

References Cited
UNITED STATES PATENTS

| 3,214,488 | 10/1965 | O'Donnell et al. | 260—29.4 UA |
| 3,231,393 | 1/1966 | Downing et al. | 117—132 A |
| 3,392,131 | 7/1968 | Miles et al. | 260—29.4 UA |
| 3,622,442 | 11/1971 | Reardon | 260—29.4 UA |
| 3,647,520 | 3/1972 | Gor et al. | 260—29.4 UA |
| 3,445,279 | 5/1969 | Abrahams et al. | 260—29.4 R |

LORENZO B. HAYES, Primary Examiner

U.S. Cl. X.R.

117—95, 97, 132 A; 260—851